United States Patent [19]

Seroussi

[11] 4,145,289
[45] Mar. 20, 1979

[54] AERATION AND FILTRATION PUMP FOR AQUARIUMS

[76] Inventor: Henry I. Seroussi, 515 West End Ave., New York, N.Y. 10024

[21] Appl. No.: 806,535

[22] Filed: Jun. 14, 1977

[51] Int. Cl.$^2$ .......................... B01D 35/02; E04H 3/16
[52] U.S. Cl. .............................. 210/169; 210/416 AS; 415/215; 417/424
[58] Field of Search .................... 210/169, 416; 119/3, 119/5; 415/215; 417/424

[56] References Cited

U.S. PATENT DOCUMENTS

| | | | |
|---|---|---|---|
| 2,194,037 | 3/1940 | Thuma | 210/169 |
| 2,275,428 | 3/1942 | Haldeman | 210/169 |
| 2,335,756 | 11/1943 | Haldeman | 210/169 |
| 2,515,538 | 7/1950 | Wall | 210/169 |
| 2,533,936 | 12/1950 | Holmes et al. | 210/169 |
| 3,610,416 | 10/1971 | Otto | 210/169 |
| 3,635,344 | 1/1972 | Lovitz | 210/169 |
| 3,662,889 | 5/1972 | Takarabe | 210/169 |
| 3,807,708 | 4/1974 | Jones | 210/169 |
| 4,039,453 | 8/1977 | Horrath | 210/169 |

*Primary Examiner*—Theodore A. Granger
*Attorney, Agent, or Firm*—Donald D. Jeffery

[57] ABSTRACT

An aeration and filtration pump for aquariums, including a housing formed with openings through which the aerated and filtered air can return to the aquarium tank, and an impeller enclosure member positioned within the housing. The impeller enclosure member includes an intermediate portion and an upper portion formed with spaced openings, with a screw impeller being positioned within said intermediate region of said enclosure member for impelling water upwardly within said member. Air impelling means are mounted above the screw impeller and force air drawn into said housing downwardly form aerating the water impelled upwardly by the screw impeller. Water is admitted to the bottom of the unit, and filter material is positioned between the converter member and the housing, with the aerated water passing through the filter material and the openings in the housing wall for return to the tank.

8 Claims, 3 Drawing Figures

AERATION AND FILTRATION PUMP FOR AQUARIUMS

BACKGROUND OF THE INVENTION

The present invention relates as indicated to an aquarium power pump, and relates more particularly to a pump specifically designed to provide new and improved aeration and filtration of the water passing inwardly of and outwardly from the pump for return to the aquarium water supply.

The aeration and filtering of aquarium water through a pumping device is per se old in the art. For example, U.S. Pat. No. 2,533,936 to Holmes et al. discloses a pump for an aquarium in which the water drawn upwardly through the pump housing is first filtered and then discharged as circulating water through a nozzle or jet. In addition, water is discharged above the level of the water in the tank in a series of fine jets to further increase the aeration effect.

U.S. Pat. No. 3,374,990 to Gray; U.S. Pat. No. 3,295,681 to Rubert et al, and U.S. Pat. No. 3,924,570 to Lamonica likewise show aerating and/or filtering means for aquarium pumps, and further show the state of the art with regard to these features. However, all of the noted art possess certain disadvantages with respect principally to cost and results achieved, and the present invention is specifically designed to overcome these disadvantages.

SUMMARY OF THE INVENTION

With the above in mind, a principal object of the invention is to provide a compact power pump designed for improved aeration and filtration, while at the same time being simple and thus inexpensive to manufacture and install. Due to the efficient operation of the pump, it can be manufactured of relatively reduced size and weight thereby permitting the same to be mounted on the top of the aquarium which may be constructed of glass or plastic. The pump unit is submerged in the tank water and functions to circulate, filter and aerate the water in the tank. Means are provided for controlling the air supply to the pump housing thereby controlling the degree of aeration of the circulated water through the device and back to the tank.

A principal feature of the invention is an impeller enclosure member which is positioned within the pump housing and which is constructed and arranged so as to receive water from the tank to be recirculated and to direct the same through a reduced diameter intermediate region in which an impeller is rotatably mounted. The upper portion of the impeller enclosure member is generally cone-shaped, comprising a plurality of segments spaced from each other so as to permit the aerated water to flow through said spaces or openings into the filter material positioned around the enclosure member and within the pump housing. The latter is provided with a plurality of openings in the side wall thereof through which the aerated and filtered water can pass for return to the tank.

A motor preferably mounted at the top of the aquarium drives the impeller, and rotatably carried by the same drive shaft are individual fan propeller blades which function when rotated to form a downward current. Atmospheric air can be controllably admitted to the region of the impeller member above the fan propeller blades, with the result that the air is driven downwardly for intimate mixing with the water impelled upwardly by the impeller. The water thus impelled is highly aerated before passing from the enclosure member through the filtering means and the openings in the housing for return to the tank.

These and other objects will be apparent as the following description proceeds, in particular reference to the application drawings.

BRIEF DESCRIPTION OF THE APPLICATION DRAWINGS

DETAILED DESCRIPTION OF THE PREFERRED EMBODIMENTS

Figure 1:
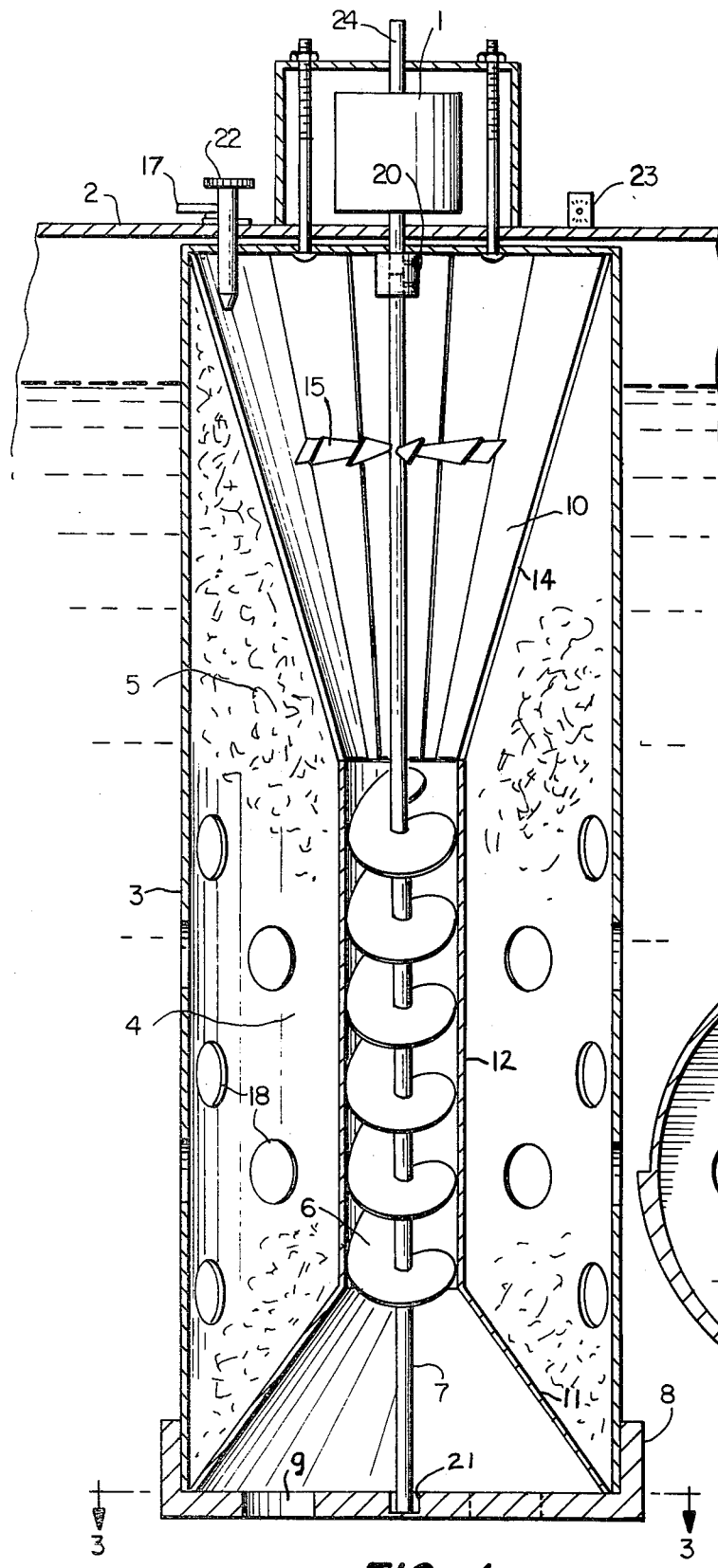
FIG. 1 is a vertical sectional view, partially fragmented, of the pump comprising the present invention.
Figure 2:
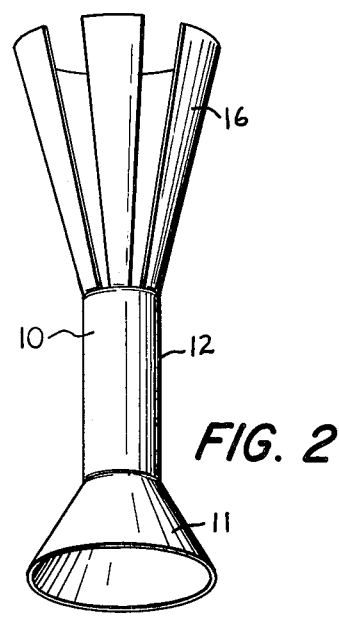
FIG. 2 is a perspective view of the impeller enclosure member.

Referring now to the application drawing, wherein like parts are indicated by like reference numerals, the pump is suspended from the top platform 2 of the aquarium, and also mounted on the platform is a housing in which is positioned an electric motor 1 having a motor shaft 24. The pump comprises an outer housing 3 within which is a filter chamber 4 which contains fibrous and porous material 5 for filtering the water. The housing 3 is formed with a plurality of openings 18 through which the filtered and aerated air returns to the housing.

Mounted within the housing 3 is an impeller enclosure member 10 which includes a conical lower end 11, a diametrically reduced intermediate section 12, and a conical upper portion 14 comprised of individual, spaced conical segments commonly designated at 16. The entire height of the enclosure member 10 is approximately the height of the housing 3, whereby the bottom cone portion 11 fits snugly into the bottom of the housing and serves as a funnel-shaped entry area for water drawn into the pump unit. The spaces between the conical segments 16 in the upper region 14 of the enclosure member permit the aerated water to pass therethrough, and hence through the filter material 5 and the openings 18 for return to the tank.

A screw impeller 6 is carried by a drive shaft 7, which is coupled at 20 to the motor shaft 24. The screw impeller is relatively snugly received in the intermediate portion 12 of the enclosure member. The shaft 7 is rotatably driven by the motor 1, and also rotatably carries a series of propeller blades 15, positioned approximately intermediate the top and bottom of the upper section 16 of the converter member. The rotation of the fan propeller 15 results in the formation of a downward current, which opposes the upward thrust of the water carried by the screw impeller 6 through the intermediate portion 12 of the enclosure member, and ambient air can enter the housing within the top portion 16 of the converter member by means of passage 17 and a passage formed in a bleeding valve 22 which regulates the flow of the air. Since the multibladed fan propeller rotates in the relatively more open region of the enclosure member, as compared with the restricted passage through the intermediate region 12, the thrust of the fan propeller 15 is easily diffused to reconcile with the main, upward current of water conveyed by the screw impeller. In this manner, the power of both the screw impeller and fan propeller 15 is not impeded, and the aerated water flows through the openings between the segments 16 of the enclosure member 10.

Figure 3:
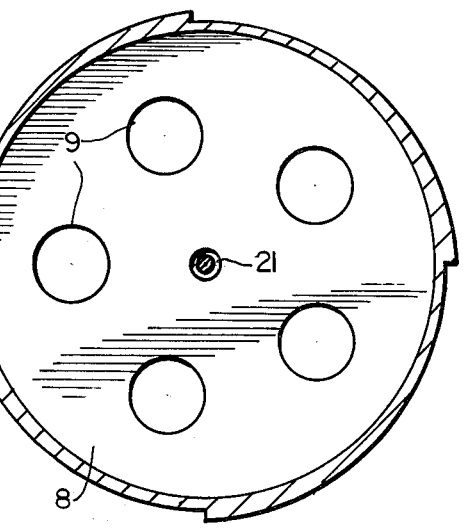
FIG. 3 is a sectional view taken on line 3—3 of FIG. 1.

To provide for the entrance of water to the pump, a bottom cap 8 is positioned over and encloses the open bottom of both the pump housing 3 and the enclosure member 10, with the cap being secured to the housing in any suitable manner. The cap is formed with a series of openings 9 through which the water can be admitted to the bottom conical section 11 of the enclosure member 10 for passage to the restricted section 12 of such member for conveyance by the screw impeller. The cap is also formed with a central recess 21 (FIG. 3) which serves to receive and centrally align the shaft 7 thereby centering the screw impeller relative to the enclosure member and the housing. The outside diameter of the bottom of the conical lower portion 11 is only slightly less than the inside diameter of the housing 3, and the same applies to the diameter at the top of the upper segmented portion 16 of the enclosure member relative to the housing, whereby the enclosure member is at all times properly positioned in the housing so as to align the intermediate region 12 thereof with the screw impeller. As noted, the cap 8 can be secured to the housing in any suitable manner such as by a threaded connection, and when the cap is threaded in place and tightened, all parts of the pump unit are in position for operation. A multi-speed switch 23 is operably connected (not shown) to the motor 1 for regulating the speed thereof, which in turn regulates the aeration and filtration processes.

The operation of the aquarium pump constructed in accordance with the invention should be apparent from the above description. To briefly summarize, water is admitted to the pump housing through the openings 9 in the cap 8, and the water is thrust upwardly by the screw impeller 6 into the upper portion of the impeller enclosure member. At the same time, air is admitted to the unit through the valve 22, and a countercurrent force is created by the propeller blades 15, which are mounted on the shaft 7 and rotated simultaneously with the screw impeller. Although these opposing forces are therefore counteractive, the rotation of the propeller 15 in the relatively enlarged upper portion 14 of the enclosure member does not impede the power of the unit, and the thrust of the water emanating from the restricted region 12 of the enclosure member results in the water intimately mixing with the air admitted to the housing thereby causing the water to be highly aerated before passing through the filter area surrounding the enclosure member for return to the aquarium tank. The amount of air admitted to the housing can be adjusted by valve 22 thereby to provide optimum operating conditions.

In addition to providing improved aeration and filtration, the pump unit is extremely simple in construction and thus inexpensive to manufacture. The interior of the unit is comprised essentially of the impeller enclosure member, the shaft 7 and the screw impeller 6 and propeller blades 15 mounted thereon. These components can be readily assembled within the housing and secured in assembled position by the bottom cap 8. If disassembly is desired for cleaning or changing the filter material, the reverse procedure is followed, and it will be noted that to either assemble or disassemble the unit, no special tools of any kind are required.

Minor changes may occur to those skilled in the art without, however, departing from the spirit or intent of the invention as above described. For example, the impeller enclosure member could be slightly modified from its illustrated form while maintaining the principal described features thereof in accordance with the invention. Likewise, more than two impeller systems could be coaxially connected to the same power unit to achieve the desired results.

I claim:

1. An aeration and filtration pump particularly adapted for use with aquariums, comprising:
   a. a housing formed with a plurality of outlet openings in the wall thereof through which the aerated and filtered air can return to the aquarium tank;
   b. an impeller enclosure member positioned within said housing and spaced therefrom along a substantial length of said member, thereby providing a filter chamber, said impeller enclosure member including an intermediate portion, and an upper portion formed with spaced openings;
   c. filter means positioned in said filter chamber for filtering water emanating from said spaced openings formed in said upper portion of said enclosure member;
   d. a screw impeller positioned within said intermediate portion of said enclosure member for impelling water upwardly within said enclosure member;
   e. means for admitting air adjacent the top of said enclosure member,
   f. air impelling means mounted above said screw impeller and functioning, when driven, to force air drawn into said enclosure member downwardly for aerating the water impelled upwardly by said screw impeller;
   g. water inlet means associated with the bottom of said housing through which water can enter for flow to said screw impeller, and
   h. means for rotating said screw impeller and said air impelling means, whereby the water forced upwardly by said screw impeller is aerated and passes through said spaced openings in said enclosure member, through said filter material, and outwardly of said housing through the outlet openings in the housing wall.

2. The pump of claim 1 wherein said impeller enclosure member comprises a generally cone shaped imperforate bottom portion the bottom edge of which is generally coterminous with the bottom of said housing, said intermediate region of said member extending vertically upwardly from the top of said bottom cone portion, and said upper portion being generally cone shaped in overall configuration and comprised of individual conical segments spaced fully around such portion, said segments being spaced to form said openings in said upper portion, the top edge of said upper portion being generally coterminous with the top of said housing, said intermediate portion being dimensioned to receive said screw impeller with sufficient clearance to permit rotation thereof.

3. The pump of claim 1 further including means for admitting air into the top of said housing within said upper portion of said enclosure member, said means including a valve for controllably adjusting the amount of said air admitted into said housing.

4. The pump of claim 3 wherein said air impelling means comprises a plurality of propeller blades mounted on said shaft above said screw impeller but below the normal water level in the tank.

5. The pump of claim 1 wherein said means for rotating said screw impeller and said air impelling means comprises a motor adapted to be mounted on the top of the aquarium tank and including a drive shaft coupled to said motor and extending downwardly through the top of said housing, said screw impeller and said air impelling means being mounted commonly on said drive shaft.

6. The pump of claim 1 wherein said means associated with the bottom of said housing comprises a cap member adapted to be secured to the bottom of said housing thereby enclosing said housing and the lower portion of said impeller enclosure member, said cap being formed with a plurality of openings through which water can enter the lower portion of said enclosure member.

7. The pump of claim 1 wherein said means for rotating said screw impeller and said air impelling means comprises a motor adapted to be mounted on the top of said aquarium tank and operatively connected to a shaft extending downwardly through said impeller enclosure member, said screw impeller and said air impelling means being mounted on said shaft for simultaneous rotation therewith, said screw impeller serving to drive the water upwardly through the intermediate region of said enclosure member while at the same time water and air are thrust downwardly by said air impelling means, and wherein said means associated with the bottom of said housing comprises a cap member operatively connected to said housing at the bottom thereof and serving to enclose said housing and said enclosure member, said cap member being formed with a plurality of openings through which water can pass to a lower portion of said enclosure member and thus upwardly to said intermediate region, and said cap member being further formed with generally central recess for receiving and aligning said shaft.

8. The pump of claim 7 wherein said impeller enclosure member further includes a lower, solid, conical shaped portion the bottom of which is generally coterminous with the bottom of said housing, the upper end of said lower portion of said enclosure member merging into said intermediate portion, and the upper end of said intermediate portion merging into said upper portion of said enclosure member, the latter being generally cone shaped and provided with spaced conical segments, the upper ends of which are generally coterminous with the upper end of said housing whereby said impeller enclosure member fits tightly within said housing.

* * * * *